Jan. 12, 1954     H. M. BUCKWALTER     2,665,733
CELLULOSE FIBER TIRE CASING PROTECTED AGAINST HEAT AGING
Filed Sept. 20, 1949
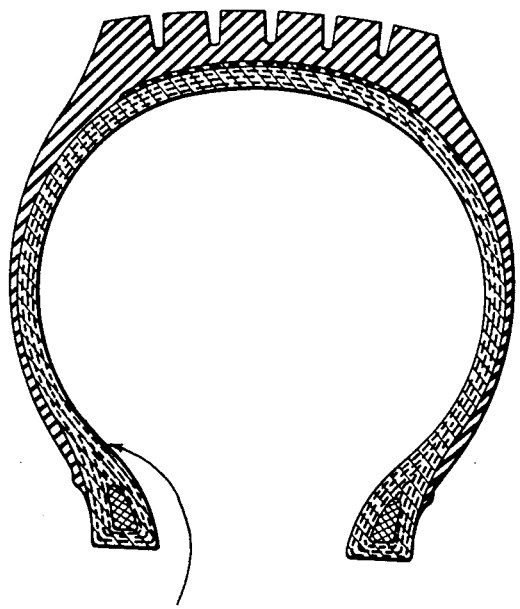
CELLULOSE TIRE CORDS CONTAINING
MELAMINE AS SUCH
TO PREVENT HEAT DETERIORATION
INVENTOR.
HOWARD M. BUCKWALTER
BY James J. Long
AGENT Patented Jan. 12, 1954

2,665,733

UNITED STATES PATENT OFFICE 2,665,733

CELLULOSE FIBER TIRE CASING PROTECTED AGAINST HEAT AGING

Howard M. Buckwalter, Detroit, Mich., assignor to United States Rubber Company, New York, N. Y., a corporation of New Jersey Application September 20, 1949, Serial No. 116,857

5 Claims. (Cl. 152—359)

This invention relates to the protection of cellulose fibers against deterioration of heat aging.

Deterioration of cellulose fiber upon subjection to elevated temperatures for prolonged periods of time is a very serious problem in the art. This problem is encountered particularly in the case of rubber articles which are reinforced with cellulose fiber, almost invariably stranded and in the form of cords of fabric, which may be a woven fabric having warp and woof threads or a so-called "weftless fabric" or "web fabric" composed of parallel cords joined together by a dry deposit of rubber latex, as described for example in the patent to Hopkinson, No. 1,424,020. Such cellulose fiber reinforced articles include pneumatic tires, steam hose, power transmission belts, conveyor belts, etc. These articles are subjected to elevated temperatures in normal use, either because they are subjected to external heating, or because they generate heat within themselves by reason of repeated rapid flexing, as in the case of pneumatic tires. The deterioration of the reinforcing cellulose fiber under the action of heat is particularly evidenced by progressive reduction in tensile strength of the fiber, leading to eventual breakage. This deteriorating action of prolonged heating on cellulose fibers is a principal cause of failure of such articles as pneumatic tires and steam hose.

The principal object of the present invention is to provide an improved method of protecting cellulose fiber, especially when stranded and in the form of a fabric, against deterioration by heat aging. Another object is to provide articles of manufacture embodying cellulose fibers protected against heat deterioration, such articles of manufacture including cellulose fibers themselves, whether unstranded, stranded or in the form of fabric, and vulcanized rubber articles reinforced with such cellulose fibers, such as pneumatic tire casings reinforced therewith. Other objects of the invention will more fully hereinafter appear.

The single figure of the accompanying drawing is a transverse sectional view of a pneumatic tire reinforced with cellulosic tire cords treated in accordance with the invention. The structure of the tire is otherwise conventional.

According to the present invention, cellulose fiber is protected against deterioration by heat aging by treatment with melamine. I have found that melamine imparts to cellulose fibers the ability to withstand deterioration by the action of heat over extended periods of time.

In carrying out the invention, the melamine may be applied to the cellulose fiber in any suitable manner, conveniently by immersing the fiber to be treated in a solution or dispersion of the melamine for a time sufficient for the fiber to become substantially impregnated with the melamine solution. The cellulose fiber employed is usually ordinary grey cotton fiber, although the process of the invention may also be employed advantageously with the various regenerated cellulose fibers, such as viscose rayon. The invention is applicable to native cellulose fibers in general, such as flax, hemp, etc., as well as to scoured, bleached and mercerized cotton, etc. In place of immersing the fiber to be treated in the melamine solution, I may incorporate the melamine in the fiber in any other suitable manner, such as by spraying or brushing.

For convenience, I usually employ the melamine in the form of an aqueous solution, typically at a concentration of 5% by weight (this being the concentration of a saturated aqueous solution at the boiling point), although marked improvement in heat age resistance is also obtainable with surprisingly dilute solutions, e. g., solutions containing 0.2% of melamine.

The treatment with melamine may be carried out at room temperature, or at elevated temperatures, for example, up to the boiling point of the aqueous solution. The time of contact between the cellulose fiber and the melamine solution should be sufficient to permit substantial penetration of the fiber. Usually treatment times of from 15 seconds to 10 minutes are adequate for this purpose, although longer treatment times are without adverse effect and may be employed if desired.

In order to obtain the benefits of the treatment of this invention it is necessary that the melamine remain in the cellulose fiber and be actually present in the fiber at the time the fiber is subjected to the heating which would ordinarily cause deterioration. I have found that melamine present in the cellulose fiber in amount from 0.1 to 4.0% on the weight of the fiber is effective to produce substantial improvement in the heat age resistance of the fiber.

The following example will illustrate the practice of my invention in more detail.

EXAMPLE

Grey cotton tire cord and rayon tire cord were immersed in boiling aqueous solutions of melamine of various concentrations for two minutes. The cords were then removed from the solution, and the excess solution was allowed to drain off the cords. The cords were then dried at 110° C. The cords were thereafter aged in the air at a temperature at 165° C. for 72 hours. This procedure is known as open heat aging. The 165° C. aging temperature is considerably in excess of the temperature at which cellulose fiber ordinarily suffers serious progressive irreversible loss of tensile strength due to chemical deterioration of the cellulose by the action of the heat, namely 125° C. After such aging the tensile strength of the treated cotton and rayon cords was determined at 70° F. and 60% relative humidity, and the results obtained were compared to control samples as indicated in the table below.

*Treatment of cotton and rayon cord with melamine*

TABLE

| Weight percent melamine in aqueous solution | Hrs. aged at 165° C. | Rayon cord | | | Cotton cord | | |
|---|---|---|---|---|---|---|---|
| | | Tensile strength, lbs. | Percent of original strength retained | Relative strength | Tensile strength, lbs. | Percent of original strength retained | Relative strength |
| 0 | 0 | 21.0 | 100 | ---- | 16.6 | 100 | ---- |
| 0 | 72 | 8.5 | 40 | 100 | 6.4 | 39 | 100 |
| 0.25 | 72 | 9.7 | 46 | 114 | 10.0 | 60 | 156 |
| 0.50 | 72 | 9.4 | 45 | 111 | 10.5 | 63 | 164 |
| 1.0 | 72 | 10.2 | 49 | 120 | 11.5 | 69 | 180 |
| 2.0 | 72 | 10.1 | 48 | 119 | 12.0 | 72 | 187 |
| 5.0 | 72 | 10.7 | 51 | 126 | 11.8 | 71 | 186 |

The data in table above show that melamine, even in small concentrations, enhances the heat stability of cellulosic fibers, whether grey cotton fibers containing the natural cotton waxes, or regenerated cellulose. The heat stabilizing effect of melamine on grey cotton is greater than it is on rayon.

I have also found that it is advantageous to combine the melamine treatment of the present invention with the treatment of cotton fibers with sodium rosinate-silicate and the like, as described in my U. S. Patent 2,297,536, issued September 29, 1942. The sodium rosinate-silicate treatment protects the grey cotton against the temporary, reversible loss of tensile strength which normally occurs substantially instantaneously upon heating the cotton to elevated temperature, while the melamine protects against the progressive, irreversible loss of strength which occurs upon extended exposure to heat. In this form of the invention the two treatments can be carried out simultaneously by adding the melamine to the sodium rosinate-silicate solution, or the treatments may be carried out successively in any desired order. If desired, the treated cord may be stretched, or stretched and shrunk, to effect further increase in tensile strength.

From the foregoing it is evident that the invention provides a method of treating cellulose fibers, whether grey cotton fibers or other forms of cellulose fiber such as regenerated cellulose, whether in the form of fibers as such, or as yarn, cord or fabric, whereby the resistance of the fiber to the deteriorating effect of prolonged exposure to elevated temperature is substantially enhanced. Thus, the improved cellulose fibers of this invention containing melamine are capable of improved serviceability especially when employed for such purposes as reinforcing tires, steam hose, and similar rubber-composite articles which normally have a limited service life because of the deteriorating action of heat on the fiber reinforcement therein.

The melamine treated fiber can be encased in rubber which may be subsequently vulcanized at elevated temperatures to a dense, strong product without any adverse effects due to the presence of the melamine. This is in contrast to certain other chemicals previously proposed for improving the heat age resistance of rayon cords and the like, but which are impractical because they decompose at vulcanizing temperatures with excessive liberation of gases, causing blowing of the tire carcass assembly. Because the melamine is stable at vulcanizing temperatures it retains its chemical identity and remains in the fiber, and is available for protecting the fiber on subsequent exposure of the vulcanized articles to high temperature conditions over extended periods of service.

The melamine is not decomposed or removed by temperatures ordinarily employed in drying or baking tire cord after the cord, usually in the form of a web fabric, has been treated with rubber latex compositions.

As indicated previously, the melamine must actually remain in the cellulose fiber and be present while the fiber is exposed to elevated temperature service conditions in order to obtain the beneficial effects of the treatment. In this respect, my treatment differs from certain conventional treatments, particularly treatments designed to obviate the temporary, reversible loss of strength observed in grey cotton fibers when heated to temperatures of about 120° C. Such temporary loss of tensile strength occurs substantially instantaneously upon heating to elevated temperature and the cotton regains its original strength upon cooling to room temperature. Such temporary reversible loss of tensile strength at elevated temperature is obviated in the prior art methods referred to by removing the waxes from the grey cotton, and such treatments are characterized by the fact that it is immaterial whether the treating agent is eventually removed from the cotton or whether the treating agent remains in the cotton. In contrast to this, the present invention is concerned with the irreversible chemical changes which occur in cellulosic fibers, whether grey cotton containing natural waxes, or dewaxed cotton, or regenerated cellulose, induced by elevated temperatures, e. g. 125° C. and higher. The desired protection against this form of deterioration is obtained only if the melamine remains as such in the treated fiber, preferably in amount of 0.1 to 4.0% on the weight of the fiber, and therefore it is undesirable to wash or extract the treated cords with solvents in a manner which would substantially remove the melamine, or to treat the cords with any chemical reagent which would react with the melamine so as to change its chemical identity and make it ineffective for its purpose.

While I have described my invention with particular reference to a preferred treatment of cellulose fibers intended to be used for reinforcing rubber articles, it will be understood that the improved melamine containing cellulose fibers of this invention are susceptible of many other uses where resistance to heat is a desirable characteristic. However, the improved cellulose fibers containing melamine are especially adapted to production of vulcanized rubber-fabric composite articles, because the melamine has no deleterious effect on the vulcanization, and resists vulcanizing temperatures, thereby resulting in improved vulcanized rubber-fabric composite articles.

It will be understood that no claim is made that the invention is capable of rendering the cellulose flame-resistant or fireproof, and when reference is made herein to protection from heat deterioration, it is merely intended to imply that the cellulose is protected against deterioration at temperatures below the ignition temperature.

Having thus described my invention, what I claim and desire to protect by Letters Patent is:

1. The method of improving the resistance of cellulose fibers to the deteriorating effects of heat aging which comprises incorporating melamine in the cellulose fiber in amount of from 0.1% to 4.0% on the weight of the fiber and preserving the melamine as such in the fiber whereby the said melamine preserved in the fibers is available as such during subsequent exposure of the thus treated fibers to heat aging and the fibers are thereby substantially preserved against permanent, irreversible loss of their original strength level after prolonged exposure to temperatures above 125° C. but below the ignition temperature of the fibers.

2. The method of improving the resistance of regenerated cellulose fibers to the deteriorating effect of heat aging which comprises impregnating the regenerated cellulose fibers with an aqueous solution containing from 0.2% to 5.0% by weight of melamine and preserving the melamine as such in the fibers whereby the said melamine preserved in the fibers is available as such during subsequent exposure of the thus treated fibers to heat aging and the fibers are thereby substantially preserved against permanent, irreversible loss of their original strength level after prolonged exposure to temperatures above 125° C. but below the ignition temperature of the fibers.

3. A vulcanized rubber article reinforced with cellulose fibers containing from 0.1% to 4.0% of melamine on the weight of the fiber as such.

4. A pneumatic tire casing reinforced with cellulose tire cords containing from 0.1% to 4.0% by weight of melamine as such on the weight of the cord.

5. A pneumatic tire casing reinforced with rayon tire cords containing from 0.1% to 4.0% of melamine as such on the weight of the cord.

HOWARD M. BUCKWALTER.

References Cited in the file of this patent

UNITED STATES PATENTS

| Number | Name | Date |
| --- | --- | --- |
| 2,263,305 | Lessig et al. | Nov. 18, 1941 |
| 2,278,284 | Reese | Mar. 31, 1942 |
| 2,350,139 | Widmer | May 30, 1944 |
| 2,421,218 | Pollack | May 27, 1947 |
| 2,524,783 | Ford et al. | Oct. 10, 1950 |

FOREIGN PATENTS

| Number | Country | Date |
| --- | --- | --- |
| 432,927 | Italy | Mar. 30, 1948 |

OTHER REFERENCES

"Effect of urea on cellulosic textiles," published in American Dyestuff Reporter, January 12, 1948, pages 10–15.